(12) United States Patent
Hwang et al.

(10) Patent No.: US 7,309,946 B2
(45) Date of Patent: Dec. 18, 2007

(54) MOTION ACTUATOR

(75) Inventors: Ing-Shouh Hwang, Taipei (TW); Shao-Kang Hung, Taipei (TW); Cheng-Shing Tin, Taipei (TW); And De Hu, Taipei (TW)

(73) Assignee: Academia Sinica, Taipei (TW)

( * ) Notice: Subject to any disclaimer, the term of this patent is extended or adjusted under 35 U.S.C. 154(b) by 933 days.

(21) Appl. No.: 10/753,258

(22) Filed: Jan. 5, 2004

(65) Prior Publication Data

US 2006/0158228 A1    Jul. 20, 2006

Related U.S. Application Data

(60) Provisional application No. 60/455,747, filed on Mar. 19, 2003.

(51) Int. Cl.
*H01L 41/08* (2006.01)

(52) U.S. Cl. .................. 310/332; 310/323.02; 310/328

(58) Field of Classification Search ........ 310/330–332, 310/328, 323.02
See application file for complete search history.

(56) References Cited

U.S. PATENT DOCUMENTS

| | | | | |
|---|---|---|---|---|
| 3,902,084 A | * | 8/1975 | May, Jr. ..................... | 310/328 |
| 4,570,096 A | * | 2/1986 | Hara et al. .................. | 310/328 |
| 4,874,979 A | * | 10/1989 | Rapp .......................... | 310/328 |
| 4,947,077 A | * | 8/1990 | Murata ....................... | 310/328 |
| 5,089,740 A | * | 2/1992 | Ono ........................... | 310/328 |
| 6,211,605 B1 | * | 4/2001 | Burov et al. ................ | 310/328 |
| 6,239,533 B1 | * | 5/2001 | Burov et al. ................ | 310/328 |
| 6,437,485 B1 | * | 8/2002 | Johansson ................... | 310/332 |
| 6,798,117 B2 | * | 9/2004 | Johansson et al. ..... | 310/323.02 |
| 7,173,363 B2 | * | 2/2007 | Hendriks et al. ........... | 310/328 |

* cited by examiner

*Primary Examiner*—Mark Budd
(74) *Attorney, Agent, or Firm*—Sughrue Mion, PLLC; Joseph Bach

(57) ABSTRACT

A motion actuator comprises a cylindrical movable shaft and a stage that contains an expansible/contractible device and two clamps. The expansible/contractible device can be controlled to drive the axial motion of the movable shaft, and the two clamps can be controlled to grip/release the shaft. The two clamps and the expansible/contractible device are each controlled by a bimorph structure, which comprises a cut cylindrical piezoelectric tube section in a hole enclosed by a thin wall in the stage. By sequentially activating the three piezoelectric tube sections, axial motions of the movable shaft relative to the stage in small steps are made. Each of the two clamps can be adjusted by a screw, which presses a spring structure that makes contact with the top surface of the movable shaft, so that the clamps can grip the movable shaft firmly when actuated, but not when not actuated. The flat top surface of the movable shaft is designed to inhibit the possible rotation along its axis during its axial motion. The shaft is supported by two lines at the bottom of each of the two clamps to reduce the contact area, which improves the reliability of the motion.

10 Claims, 3 Drawing Sheets

MOTION ACTUATOR

CROSS-REFERENCE TO RELATED APPLICATION

This regular U.S. patent application is based on and claims the benefit of U.S. provisional patent application Ser. No. 60/455,747, filed Mar. 19, 2003, the entire disclosure of which is relied upon and incorporated by reference herein.

FIELD OF THE INVENTION

The present invention relates to a motion actuator, especially to a long distance linear motion actuator.

BACKGROUND OF THE INVENTION

In nanotechnology, one of the key techniques is to achieve fine positioning with a sub-micrometer resolution. For example, in scanning probe microscopy, the probe has to be brought close to a sample from a few mm apart to within a distance of only a few nanometers. There are many other applications wherein fine positioning and motion of articles are required.

An early type of a piezoelectric inchworm motor was disclosed by William G. May, Jr., in his U.S. Pat. No. 3,902,084, "Piezoelectric electromechanical translation apparatus" (assigned to Burleigh Instruments, Inc.). Later, H. Atsushi et al. disclosed a modification to May's invention in their U.S. Pat. No. 4,570,096, "Electromechanical translation device comprising an electrostrictive driver of a stacked ceramic capacitor type" (assigned to NEC Corporation.). They are used for micropositioning in scanning tunneling microscopes and atomic force microscopes.

Another type of an inchworm linear motor, based on the same operation mechanism as the Burleigh inchworm but with a very different mechanical design, also applied to scanning tunneling microscopes, was disclosed by one of the inventors of this invention in his Ph.D thesis: I. S. Hwang, "Tunneling microscopy of dynamical processes on the PB/GE(111) surface, Harvard University, Division of Applied Sciences, 1993, Chapter 2.

The device included a cylindrical movable shaft and a stage that contains an expansible/contractible device for driving the movable shaft and two clamps. The stage, the expansible/contractible device, and the two clamps were all machined from a single MACOR piece. The motion of the expansible/contractible device and the clamping/unclamping of the two clamps were separately controlled by three similar bimorph structures. Each bimorph structure was made by gluing a cut cylindrical piezoelectric tube section to a hole with a thin wall in the MACOR piece. This structure is compact and rigid, thus it exhibits very good mechanical stability against mechanical vibrations. However, the outer surface of the movable shaft and the surfaces of the two clamps that make contact with the shaft have to be machined with precision and accuracy better than 10 micrometers; otherwise the clamping and unclamping motions cannot be actuated properly. Another problem is that the shaft may rotate along its axis during the translational motion.

OBJECTIVES OF THE INVENTION

The objective of this invention is to provide a modified motion actuator to allow a greater tolerance in preciseness in fabrication.

Another objective of this invention is to provide a compact and rigid motion actuator.

Another objective of this invention is to provide a motion actuator with an adjusting mechanism whereby machining of object to be moved is made easier.

Another objective of this invention is to provide a motion actuator to prevent undesired rotation of the object to be moved.

Another objective of this invention is to provide a motion actuator with uniform and reliable translation motions.

SUMMARY OF THE INVENTION

According to the present invention, a modified motion actuator to provide a linear translational motion in small steps is disclosed. The motion actuator of this invention comprises a cylindrical movable shaft and a stage that contains an expansible/contractible device and two clamps. The expansible/contractible device can be controlled to drive the axial motion of the movable shaft, and the two clamps can be controlled to grip/release the shaft. The two clamps and the expansible/contractible device are each controlled by a bimorph structure, which comprises a cut cylindrical piezoelectric tube section in a hole enclosed by a thin wall in the stage.

The stage and the shaft can be made out of a ceramic or metallic material. The movable shaft can be hollow inside to house any device or apparatus that needs to be transferred translationally. By sequentially activating the three piezoelectric tube sections, axial motions of the movable shaft relative to the stage in small steps are made. Each of the two clamps can be adjusted by a screw, which presses a spring structure that makes contact with the top surface of the movable shaft, so that the clamps can grip the movable shaft firmly when actuated, but not when not actuated. The flat top surface of the movable shaft is designed to inhibit the possible rotation along its axis during its axial motion. The shaft is supported by two lines at the bottom of each of the two clamps to reduce the contact area, which improves the reliability of the motion. If either the stage or the movable shaft is made out of a metallic material, it can be machined easily with an electrical discharge machine.

These and other objectives and advantages of this invention may be clearly understood from the detailed description by referring to the following drawings.

DETAILED DESCRIPTION OF THE INVENTION

The motion actuator of this invention comprises a cylindrical movable shaft and a main body to drive the movable shaft. The main body which comprises a stage, as well as an expansible/contractible device and two clamps, can be made out of a single piece of a ceramic material, such as MACOR, or a hard metallic material, such as stainless steel. Stainless steel is preferred, because it allows the machining with an electrical discharge machine.

Figure 1:
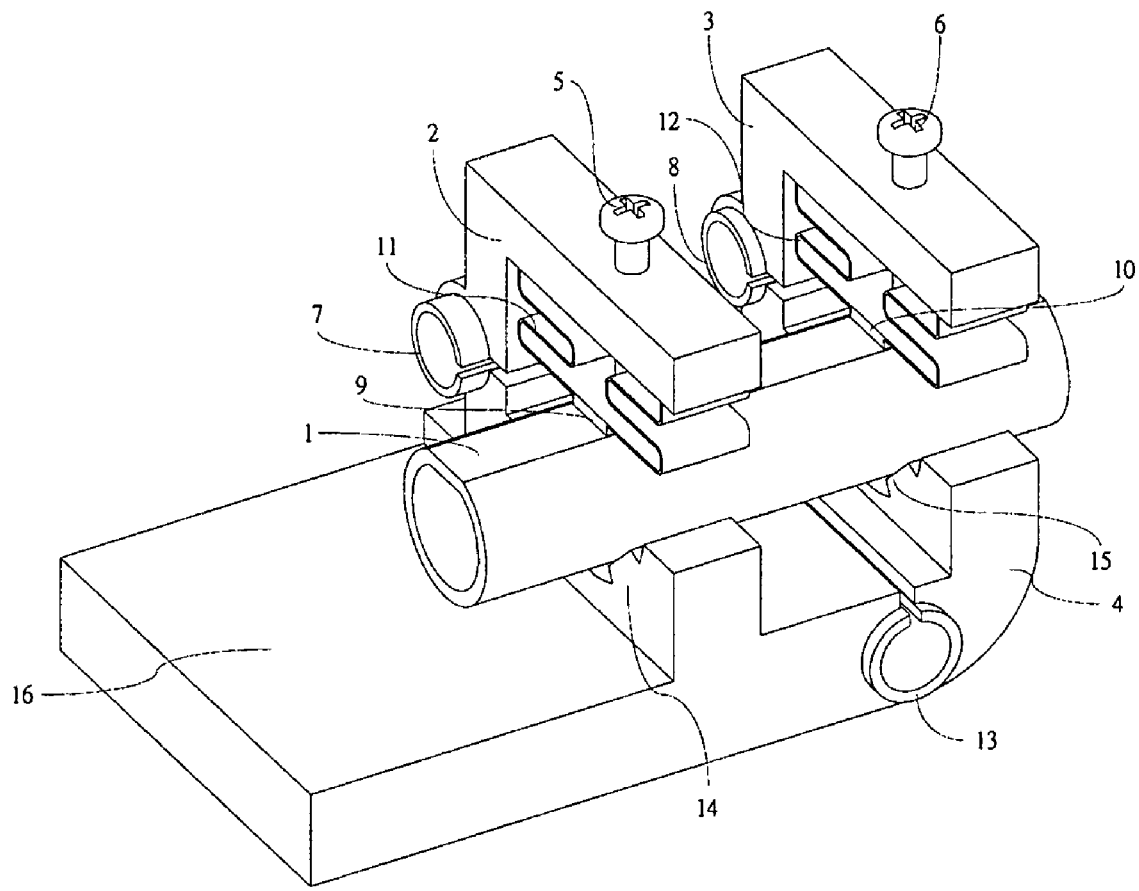
FIG. 1 illustrates the structure of the motion actuator of an embodiment of this invention.
Figure 2:
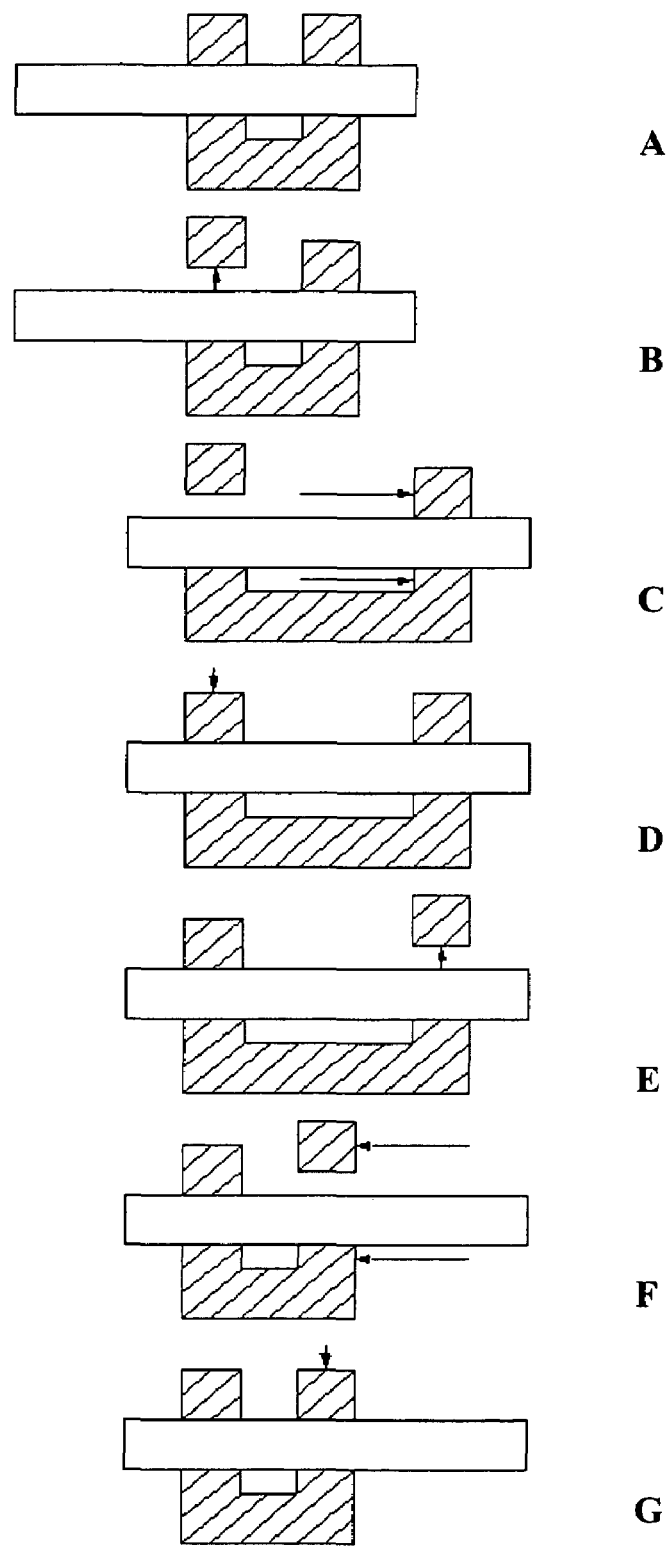
FIGS. 2a-2g show the steps wherein motion of a moving shaft is actuated and controlled.

FIG. 1 shows the structure of one embodiment of the motion actuator of this invention. As shown in this figure, the motion actuator of this invention has a main body to drive a movable shaft 1. The main body comprises a stage 16 which has two clamps 2 and 3 that can be controlled to grip the movable shaft, and an expansible/contractible device 4 for driving the movable shaft 1. Denoted at 7 and 8 are actuators that control the grip of the movable shaft 1 by the two clamps 2 and 3, respectively. The expansible/contractible device 4 is controlled by the actuator 13.

In the present invention, the actuators 7, 8 and 13 are preferably implemented as a cut cylindrical piezoelectric tube that glued to a hole in the main body of the inchworm linear motor. High voltages can be applied separately to each of the cut piezoelectric tube 7, 8 and 13, resulting in the contraction of the circumference of the piezoelectric tube 7, 8 or 13. The clamping motion is further amplified by the bimorph structure formed with the combination of the cut piezoelectric tube and the thin part of the main body. Thus, when a high voltage is applied to the actuator 7 or 8, the associated clamp makes a firm grip with the shaft 1.

In the two clamps 2 and 3, each has a spring system with an adjusting screw 5 and 6, which push the pad 9 and 10, respectively, to engage contact with the flat top surface of the shaft. Each screw is adjusted separately to a position that the pad 9, 10 can have a firm contact with the top surface of the movable shaft 1 when the associated actuator 7 or 8 is activated, but a loose contact when not activated. Denoted at 11 and 12 are spring structures that connect the pad 9, 10 to the associated clamps 2 and 3. Two protrusions, which are at the bottom of the two clamps 2, 3, denoted at 14 and 15, are used to support the movable shaft 1 and provide the guiding of the linear motion of the movable shaft 1. The small contact areas at the protrusions 14, 15 ensure a more reliable motion of the movable shaft 1. The planar contact of the pads 9 and 10 with the flat top of the movable shaft 1 is designed to prevent the possible rotation of the movable shaft 1 along its axis during the linear motion.

The expansion/contraction motion of device 4 is implemented by applying a high voltage to the piezoelectric tube 13. The spacing between the two clamps 2 and 3 expands/contracts according to the polarity of the piezoelectric tube 13. The stage denoted at 16 can be used to mount any device, such as a sample holder.

The control sequence for translating the movable shaft 1 by the invented motion actuator of this invention will be described below. FIG. 2a-g show the steps of the motion translation of this invention.

As shown in this figure, at stage A, high voltage is applied to the first piezoelectric tube 7, the second piezoelectric tube 8 and the third piezoelectric tube 13 to actuate the first polarity of the expansible/contractible device 4, the first clamp 2 and the second clamp 3 to grip the movable shaft 1 firmly. At stage B, stop applying the voltage to the second piezoelectric tube 2 to actuate the second polarity of the second clamp 3. The second clamp 3 releases the movable shaft 1. At stage C, stop applying voltage to the third piezoelectric tube 13 to actuate the second polarity of the expansible/contractible device 4. The movable shaft 1 is thus translated by the expansible/contractible device 4 to move along its axis for a step distance. Then at stage D, apply the voltage to the second piezoelectric tube 8 to actuate the first polarity of the clamp 3, so that the second clamp 3 grips the movable shaft 1 firmly. At stage E, stop applying voltage to the first piezoelectric tube 7 to actuate the second polarity of the first clamp 2. The first clamp 2 releases the movable shaft 1. At stage F, apply the voltage to the third piezoelectric tube 13 to actuate the first polarity of the expansible/contractible device 4. That makes the first clamp 2 to return to its original position. At stage G, apply the voltage to the first piezoelectric tube 7 to actuate the first polarity of the first clamp 2. The system returns to the situation of stage A.

Repeating the above 6 steps, the movable shaft 1 can be driven to move linearly in fine steps on the stage 16.

Figure 3:
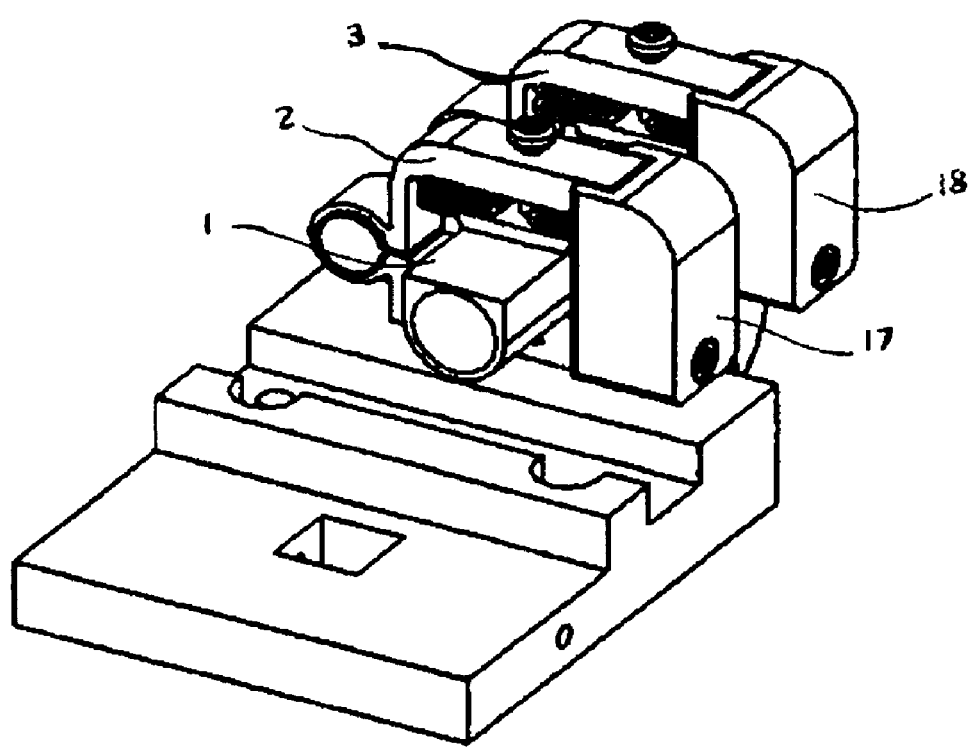
FIG. 3 illustrates the structure of the motion actuator of another embodiment of this invention.

The step size of the linear motion can be controlled by the voltage that applied to the actuator 13. The speed of the linear motion is determined by the step size and the cycle time of each step. The motion can be reversed by switching the actuation sequence on actuators 1 and 2. The reverse of the voltage polarity that actuates the cut piezoelectric tube 13 can also lead to the reverse of the linear motion. FIG. 3 illustrates the structure of another embodiment of the motion actuator of this invention. Elements that are the same as those in FIG. 1 are labeled with same figures.

As shown in FIG. 3, the motion actuator of this embodiment comprises a stopper 17, 18 at the opposite side of the stage 16, in relating to the clamps 2 and 3. The stoppers 17, 18 limit the clamping angle of clamps 2 and 3, respectively, so that when adjusting the screws 5 and 6, the rotation angle of the clamps 2 and 3 is restrained. Damage to the piezoelectric tubes 7 and 8 is thus prevented.

The upper surface of the movable shaft 1 may be enlarged by changing the cross-sectional shape of the movable shaft 1. For example, the movable shaft 1 may be fabricated to have a reversed arch shape in its cross section. This can make the width of the upper flat surface of the movable shaft 1 substantially the same as its diameter. By enlarging the upper flat surface of the movable shaft 1, the contact surface between the movable shaft 1 and the spring structure 11 and 12 may be enlarged, so that the clamps 2 and 3 can grip the movable shaft 1 in a tighter manner.

In the above described embodiments, the movable shaft 1 can be hollow inside to house any device that needs to be transferred by this motion actuator. The moving shaft 1 can be made out of a ceramic material or any metal with strong hardness. In the embodiment of this invention, metal is preferred, as it can be electronically grounded to shield the electronic signals of the device that is housed inside the shaft.

This is especially favorable for scanning probe microscopes, as the detected low-level electronic signals are susceptible to electronic interferences outside the device.

While operating in special environments (such as in vacuum), more modifications may be made by, for example, adding pads of a different material from the shaft (such as MACOR or glass) to the contact surface of the protrusions 14, 15 and pads 9, 10 to prevent deadlock of the moving shaft 1 in the clamps 2, 3. Another alternative is to do a metal surface treatment to the moving shaft 1 to modify the contact surface between it and the protrusions 14, 15 and pads 9, 10, for example, the surface of shaft 1 is electroplated with a thin gold (or silver) film.

The new motion actuator of this invention is usable as a fine positioning device. As can be found in the prior art, this invention modifies the design of Hwang and makes the motion actuator easier to machine. The present invention has made several improvements, so that the motion actuator can be more easily and reliably fabricated. Also the possible rotation of the shaft along its long axis during the linear motion is prevented. This design is compact. Many devices can be housed inside the moving shaft and be transferred by the motion actuator with fine positioning.

As the present invention has been shown and described with reference to preferred embodiments thereof, those skilled in the art will recognize that the above and other changes may be made therein without departing form the spirit and scope of the invention.

What is claimed is:

1. A motion actuator comprising a movable shaft and a main body;
   wherein said main body comprises:
   a stage;
   two clamps provided in said stage and controlled respectively by bimorph structure; and
   an expansible/contractible device provided in said stage and controlled by a bimorph structure;
   characterized in that said movable shaft comprises a flat upper surface and that by sequentially activating said two clamps and said expansible/contractible device separately and jointly, axial motions of said movable shaft relative to said stage in small steps are made.

2. The motion actuator according to claim 1 wherein said bimorph structure comprises a cut cylindrical piezoelectric tube section in a hole enclosed by a thin wall in said stage.

3. The motion actuator according to claim 1 wherein said movable shaft comprises hollow inside to house any device or apparatus that needs to be translated.

4. The motion actuator according to claim 1, further comprising spring structure at said clamps, adjustable by a screw, to provide contact with the top surface of said movable shaft, so that said clamps grip said movable shaft firmly when actuated.

5. The motion actuator according to claim 1 wherein said movable shaft is supported by two lines at bottom said two clamps respectively.

6. The motion actuator according to claim 1 wherein said stage, said clamps and said expansible/contractible device are made in one piece with a hard material.

7. The motion actuator according to any one of claims 1-6, wherein said movable shaft comprises a hollow reverse arch shape tube in its cross section, whereby to provide an enlarged flat upper surface.

8. The motion actuator according to any one of claims 1-6, further comprising a stopper to limit the clamping angle of each said clamps.

9. The motion actuator according to claims 7, further comprising a stopper to limit the clamping angle of each said clamps.

10. The motion actuator according to claim 5, further comprising a pad of a different material on each of said two lines and said pads.

* * * * *